United States Patent [19]

Takeuchi et al.

[11] Patent Number: 4,855,729

[45] Date of Patent: Aug. 8, 1989

[54] COMMUNICATION CONTROL SYSTEM OF FLUID CONTROL VALVE

[75] Inventors: Kunihiko Takeuchi, Kawasaki; Fujio Baba; Yasuo Shimomura, both of Tokyo, all of Japan

[73] Assignee: Tokyo Keiki Company Ltd., Tokyo, Japan

[21] Appl. No.: 12,654

[22] Filed: Feb. 9, 1987

[30] Foreign Application Priority Data

Feb. 10, 1986 [JP] Japan ................................. 61-27524

[51] Int. Cl.[4] .......................... G08B 21/00; H04Q 9/12
[52] U.S. Cl. .......................... 340/825.05; 340/825.07; 455/603; 455/606; 137/487.5
[58] Field of Search ...................... 340/825.05, 825.07, 340/825.08, 825.14, 825.16, 825.18; 455/603, 606, 607, 612; 370/89, 86; 364/138, 141, 510, 550; 137/487.5, 554, 624.11

[56] References Cited

U.S. PATENT DOCUMENTS

| | | | |
|---|---|---|---|
| 4,263,580 | 4/1981 | Sato et al. ........................ | 340/825.18 |
| 4,459,591 | 7/1984 | Haubner et al. ................ | 340/825.05 |
| 4,482,980 | 11/1984 | Korowitz et al. ................ | 455/606 |
| 4,489,379 | 12/1984 | Lanier et al. .................... | 370/86 |
| 4,517,644 | 5/1985 | Hamada et al. ................. | 370/86 |
| 4,554,673 | 11/1985 | Stevens ........................... | 370/86 |
| 4,573,114 | 2/1986 | Ferguson et al. ................ | 364/510 |
| 4,596,013 | 6/1986 | Tashiro et al. .................. | 340/825.05 |
| 4,651,317 | 3/1987 | Tashiro et al. .................. | 370/86 |
| 4,654,890 | 3/1987 | Hasegawa et al. .............. | 340/825.05 |
| 4,706,703 | 11/1987 | Takeuchi et al. ................ | 137/487.5 |
| 4,742,572 | 5/1988 | Yokoyama ....................... | 340/825.07 |

*Primary Examiner*—Donald J. Yusko
*Assistant Examiner*—Tyrone Queen
*Attorney, Agent, or Firm*—Wenderoth, Lind & Ponack

[57] ABSTRACT

A plurality of terminal units are connected to the central unit by one optical fiber line in a loop form, thereby forming a communication link. The central unit converts the data including the terminal address and control bit into the serial optical signal and outputs this optical signal. The terminal unit receives and interprets the optical signal from the central unit and ON/OFF controls the solenoid valve. After completion of the control, the terminal unit rewrites the control bit in the reception data to the data bit indicative of the operating state of the valve and transmits the data bit to the next terminal unit. The central unit receives the signal from the final terminal unit and interprets the bit data which was rewritten from the control bit by the terminal unit, thereby displaying the operating state of the valve.

4 Claims, 6 Drawing Sheets

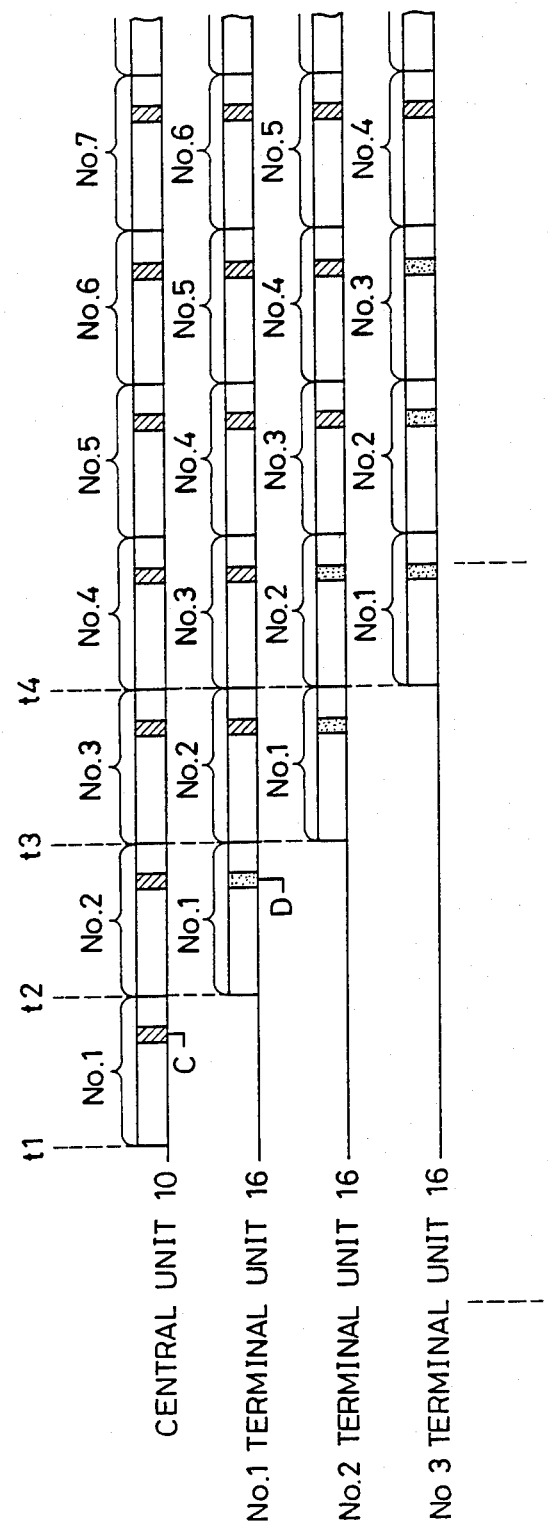

4,855,729

COMMUNICATION CONTROL SYSTEM OF FLUID CONTROL VALVE

BACKGROUND OF THE INVENTION

The present invention relates to a communication control system of fluid control valves in which control signals are transmitted from a central unit to a plurality of terminal units by an optical fiber link, thereby remotely controlling the fluid control valves.

Hitherto, as a system for remotely controlling a plurality of fluid control valves provided on the sides of terminals by a sequence controller or the like, such a system as shown in, e.g., FIG. 1 has been known.

In FIG. 1, reference numeral 100 denotes a control unit using a programmable sequencer or the like. Signal lines are connected from the control unit 100 to solenoid valves 104 of a plurality of terminals 102, and control signals are supplied from the control unit 100 to the solenoid valves 104 through the signal lines. Further, each terminal 102 has a limit switch 106 to detect the operating states of terminal apparatuses such as actuator, valves, and the like by the solenoid valve 104. In order to display the operating states of the terminal apparatuses by the control unit 100, each of the limit switches 106 of the terminals 102 is connected to the control unit 100 by a signal line.

However, in such a conventional remote control system, the control unit 100 is connected to the solenoid valves 104 and limit switches 106 provided for a plurality of terminals 102 by the signal lines, respectively. In general, for example, the sequence controller can connect fifty to hundred terminals 102. Therefore, the number of signal lines including the signal lines to connect the limit switches 106 is very large. Thus, the works to install the signal lines when the system is set become hard and the costs increase.

SUMMARY OF THE INVENTION

It is, therefore, an object of the present invention to provide an economical communication control system of fluid control valves in which the transmission and reception of signals between a central unit and terminal state detectors such as fluid control valves, limit switches, and the like provided for a plurality of terminal units are executed by a simple constitution of a transmission line.

Another object of the invention is to provide a communication control system of fluid control valves in which a plurality of terminals are connected to a central unit by an optical fiber line in a loop form, and the communication of control instructions from the central unit to the terminal units and the communication of signals indicative of the operating states from the terminal units to the central unit can be performed by a single loop communication.

Still another object of the invention is to provide a communication control system of fluid control valves in which even if a number of terminal units are connected by an optical fiber line in a loop form, optical data can be accurately transmitted without causing any erroneous data.

According to the invention, a plurality of terminal units which are provided integrally with or near fluid control valves are connected to a central unit through optical fiber line in a loop form, and the central unit and a plurality of terminal units are connected by a single optical fiber line.

The central unit to which a plurality of terminal units are connected by a loop-shaped optical fiber link comprises data transmitting means for converting the control data including control instructions and terminal addresses based on the control outputs from the sequence controller and the like into the serial optical signal and for repeatedly outputting this optical signal to the optical fiber line; and data receiving means for receiving the optical signal from the final terminal unit, for interpreting the data indicative of the operating states of the terminal apparatuses included in the reception data, and for outputting the result of the interpretation. On the other hand, each of a plurality of terminal units comprises transmitting/receiving means for converting the optical signal obtained through the optical fiber line into the reception data, for again converting the reception optical data into the serial optical signal synchronously with the detection of the end of reception of the reception data, and for transmitting this optical signal to the optical fiber line at the post stage; address discriminating means for outputting a control signal corresponding to the control instruction bits of the reception optical data to the fluid control valve when the self address is discriminated from the reception optical data; and data changing means for changing the control instruction bit of the reception optical data into the data bit indicative of the operating state of the terminal apparatus by the fluid control valve when the self address is discriminated by the address discriminating means, and for transmitting the data bit by the transmitting/receiving means.

A plurality of terminal units are connected to the central unit by the optical fiber line in a loop form, thereby constituting the optical fiber link. Therefore, it is sufficient to form only the optical fiber line of one loop irrespective of the number of terminals. It is easy to install the line and the system costs can be remarkably reduced.

On the other hand, when the self address is discriminated in the terminal unit, the fluid control valve is controlled on the basis of the control instruction bit of the reception data and at the same time, the control instruction bit of the reception data is changed to the data bit based on the ON or OFF or the like of the limit switch which indicates the operating state of the terminal apparatus at the time when the fluid control valve is controlled, and the data bit is transmitted to the optical fiber line at the post stage. Therefore, the signal which is returned from the terminal unit to the central unit by way of the loop-shaped optical fiber line includes the bit data indicative of the operating state of the terminal apparatus. By interpreting the return data by the central unit, the operating state of the terminal apparatus can be displayed by the sequence controller or the like.

The above and other objects, features, and advantages of the present invention will become more apparent from the following detailed description in conjunction with the accompanying drawings.

BRIEF DESCRIPTION OF THE DRAWINGS

FIG. 7 is a timing chart showing the communicating operation according to the invention.

DETAILED DESCRIPTION OF A PREFERRED EMBODIMENT

Figure 1:
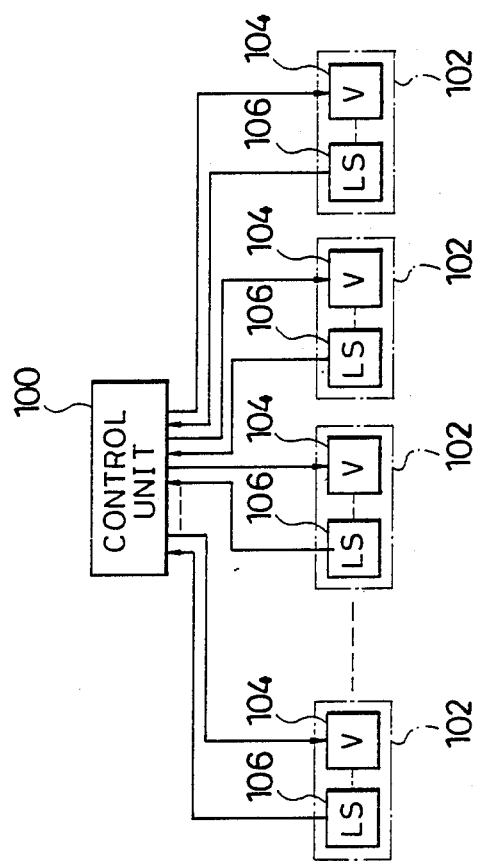
FIG. 1 is a block diagram showing a conventional system.
Figure 2:
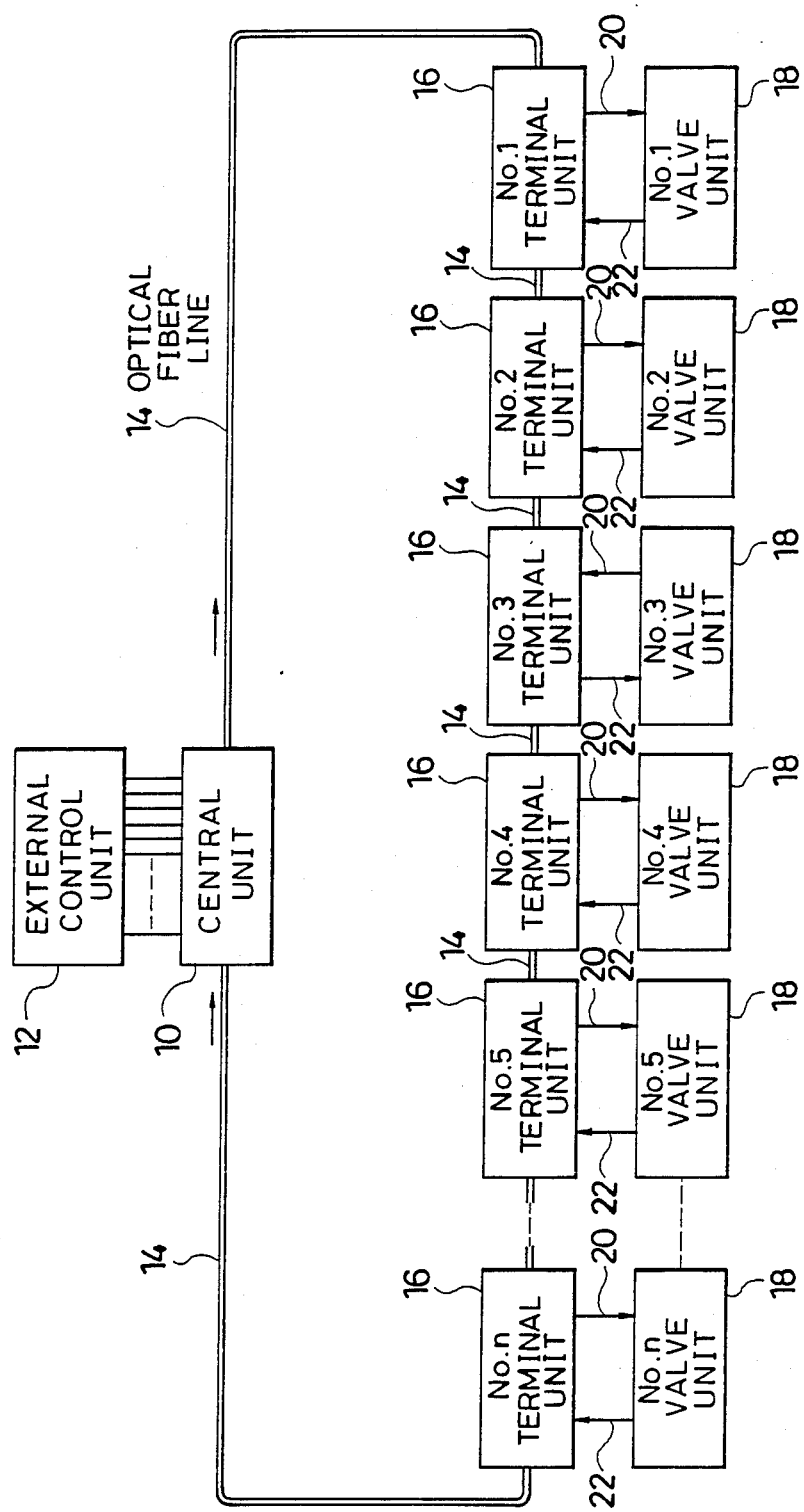
FIG. 2 is a block diagram showing an embodiment of a system constitution according to the present invention.

In FIG. 2, a central unit 10 receives a plurality of solenoid valve control signals which are output from an external control unit 12 such as a sequence controller or the like. For example, the central unit 10 can receive up to sixty-four solenoid valve control signals from the external control unit 12.

The central unit 10 has data transmitting means for converting a plurality of solenoid valve control signals from the external control unit 12 into the control data including the control instructions and terminal addresses every control signal, for converting the control data of each terminal into the serial data, and for outputting the serial data as the optical signal by driving a light emitting circuit. The central unit 10 also has data receiving means for receiving the optical signal returned from the terminal side, for converting this optical signal into the reception optical data, for interpreting the data indicative of the operating state of the terminal apparatus which is included in the reception optical data, and for displaying the operating state by the external control unit 12.

A plurality of terminal units 16 are connected to the central unit 10 through an optical fiber line 14 in a loop form. Namely, the optical signal from the central unit 10 is supplied to the terminal unit 16 of No. 1 through the optical fiber line 14. This optical signal is sequentially supplied from the terminal unit 16 of No. 1 to the subsequent terminal units 16 of No. 2, No. 3, . . . , and No. n. Thereafter, the optical signal is returned to the central unit 10 through the optical fiber line 14. In this way, an optical fiber link is constituted.

The terminal units 16 of Nos. 1 to n are arranged integrally with or near valve units 18 of Nos. 1 to n, respectively. The terminal units 16 of Nos. 1 to n receive the optical signal from the central unit 10 through the optical fiber line 14 and convert the optical signal into the reception optical data. Then, the terminal units 16 output control signals 20 corresponding to the control instruction bits included in the reception optical data to the valve units 18 of Nos. 1 to n, thereby making operative or inoperative, for example, solenoid valves which are attached to the valve units 18 of Nos. 1 to n, respectively. Further, each of the valve units 18 of Nos. 1 to n has a state detector such as a limit switch or the like for detecting the operating states of an actuator, an air valve, and the like which are driven by, e.g., the ON/OFF control of the pneumatic pressure by the solenoid valve. A detection signal 22 from the limit switch is supplied from each of the valve units 18 of Nos. 1 to n to each of the terminal units 16 of Nos. 1 to n. In response to the detection signal 22, when each terminal unit 16 detects the coincidence of the self address with the address included in the reception data from the central unit 10, the terminal unit 16 changes the control instruction bit included in the reception optical data to the data bit indicative of the content of the detection signal and converts into the serial optical signal. Then, the terminal unit 16 transmits the serial optical signal to the optical fiber line 14 at the post stage. On the contrary, when the address included in the reception optical data does not coincide with the self address of the terminal unit 16, the same data as the reception optical data is sent to the next terminal unit. Thus, the central unit 10 sequentially receives the return data which was sent from each of the terminal units 16 of Nos. 1 to n and which includes the data bit indicative of the operating state of the terminal apparatus. The data receiving means in the central unit 10 interprets the data bit indicative of the state of the terminal apparatus in each reception data and outputs the detection signal to the external control unit 12. The operating state of each terminal apparatus can be displayed by the external control unit 12.

Figure 3:
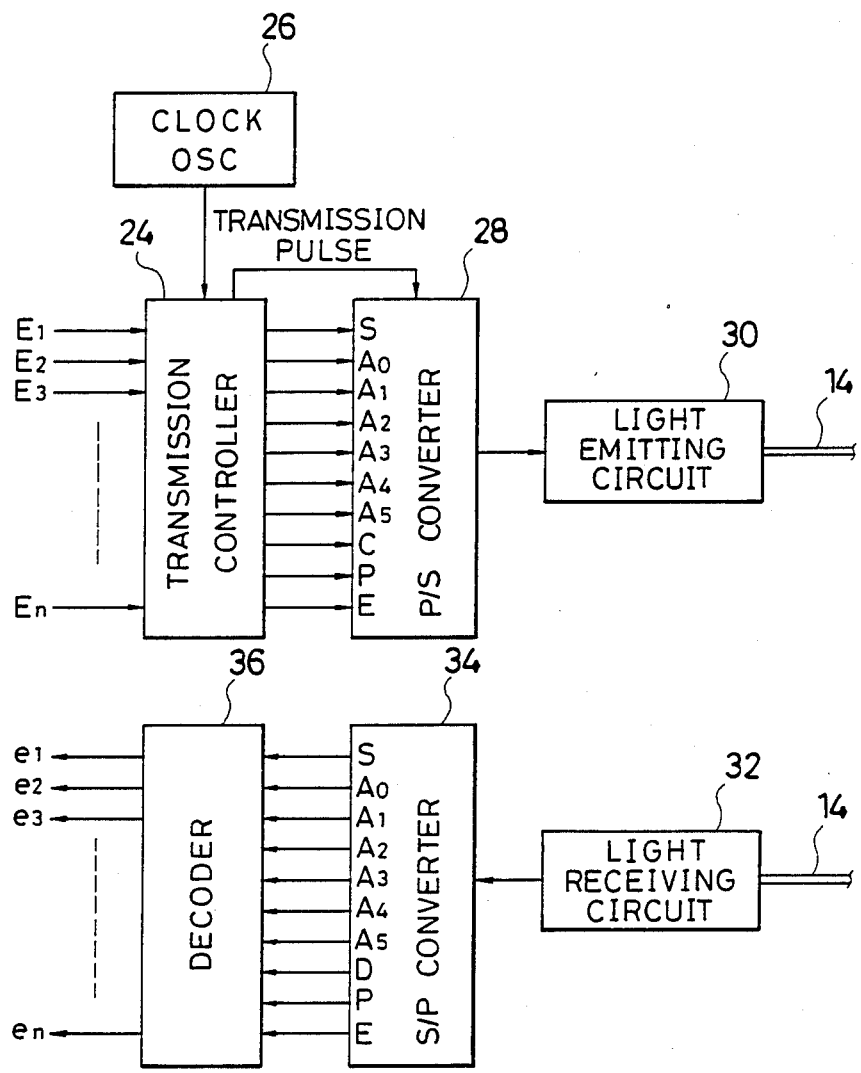
FIG. 3 is a block diagram showing an embodiment of a central unit in FIG. 2.

FIG. 3 is a block diagram showing a practical embodiment of the central unit 10 shown in FIG. 2.

First, the data transmitting means in the central unit 10 comprises a transmission controller 24; a clock oscillator 26; a parallel/series converter 28; and a light emitting circuit 30.

Solenoid valve control signals $E_1$, $E_2$, . . . , $E_n$ of the terminals are supplied from the external control unit 12 to the transmission controller 24. Each of the control signals $E_1$ to $E_n$ has a logic level which is set to "1" when a current is supplied to the solenoid valve and is set to "0" when the supply of the current to the solenoid valve is stopped. On the basis of the solenoid valve control signals $E_1$ to $E_n$ from the external control unit 12, the transmission controller 24 produces the transmission data to the terminal units as shown in, e.g., FIG. 5 and outputs in parallel the communication data of each terminal to the parallel/series converter (P/S converter) 28 synchronously with a clock pulse from the clock oscillator 26.

Figure 5:
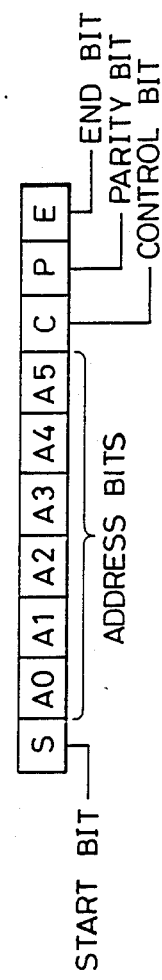
FIG. 5 is an explanatory diagram of a frame constitution of communication data by the central unit.

The communication data of each terminal which is produced by the transmission controller 24 consists of ten bits as shown in FIG. 5. One frame of the communication data is constituted by: a start bit "S"; address bits "$A_0$" to "$A_5$" of six bits; a control bit "C" as a control instruction bit; a parity bit "P"; and an end bit "E". Since the address bits "A0" to "A5" consist of six bits, the addresses of up to sixty-four terminals can be designated.

Referring again to FIG. 3, the output of the P/S converter 28 is supplied to the light emitting circuit 30. The transmission pulses from the transmission controller 24 are supplied to the P/S converter 28. The P/S converter 28 converts the communication data of ten bits which were input in parallel from the transmission controller 24 into the serial data and sequentially outputs to the light emitting circuit 30. When the bit is set to "1", the light emitting circuit 30 drives the light emitting element, thereby allowing the optical signal to be transmitted to the optical fiber line 14. When the bit is set to "0", the light emitting circuit 30 transmits the optical signal to stop the light emitting operation. On the terminal unit side, the communication data bits can be received on the basis of the presence or absence of the optical signal.

Figure 6:
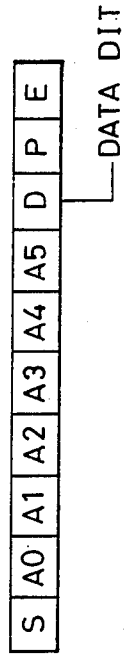
FIG. 6 is an explanatory diagram of a frame constitution of data which is returned from the terminal unit.

On the other hand, the optical signal returned from the final terminal unit through the optical fiber line 14 is input to a light receiving circuit 32. The optical signal is converted into the reception optical data by the light receiving circuit 32 and input to a series/parallel converter (S/P converter) 34. The serial reception optical data is converted into the same parallel reception optical data of ten bits as the communication data. The parallel reception optical data which is output from the S/P converter 34 has a frame constitution shown in FIG. 6.

Namely, one frame comprises a start bit "S"; address bits "$A_0$" to "$A_5$" of six bits; a parity bit "P"; an end bit "E"; (these nine bits are the same as those in the transmission data in FIG. 5); and further a data bit "D" in place of the control bit "C" as the control instruction bit in the transmission data. Namely, the control bit "C" (refer to FIG. 5) in the communication data from the central unit 10 is rewritten to the data bit "D" indicative of the operating state of the terminal apparatus by the terminal unit, then the data bit "D" is returned to the central unit 10.

The parallel outputs of the reception optical data converted by the S/P converter 34 are given to a decoder 36. The decoder 36 discriminates the terminal on the basis of the address bits "$A_0$" to "$A_5$" in the reception optical data and interprets the operating state of the terminal apparatus, for example, whether the valve is closed or open on the basis of the data bit "D". The decoder 36 outputs detection signals $e_1$ to $e_n$ representative of the operating states of the terminal apparatuses to the external control unit 12. There is the one-to-one corresponding relation between the terminals and the detection signals $e_1$ to $e_n$. The operating states of the terminal apparatuses can be displayed by the external control unit 12.

Figure 4:
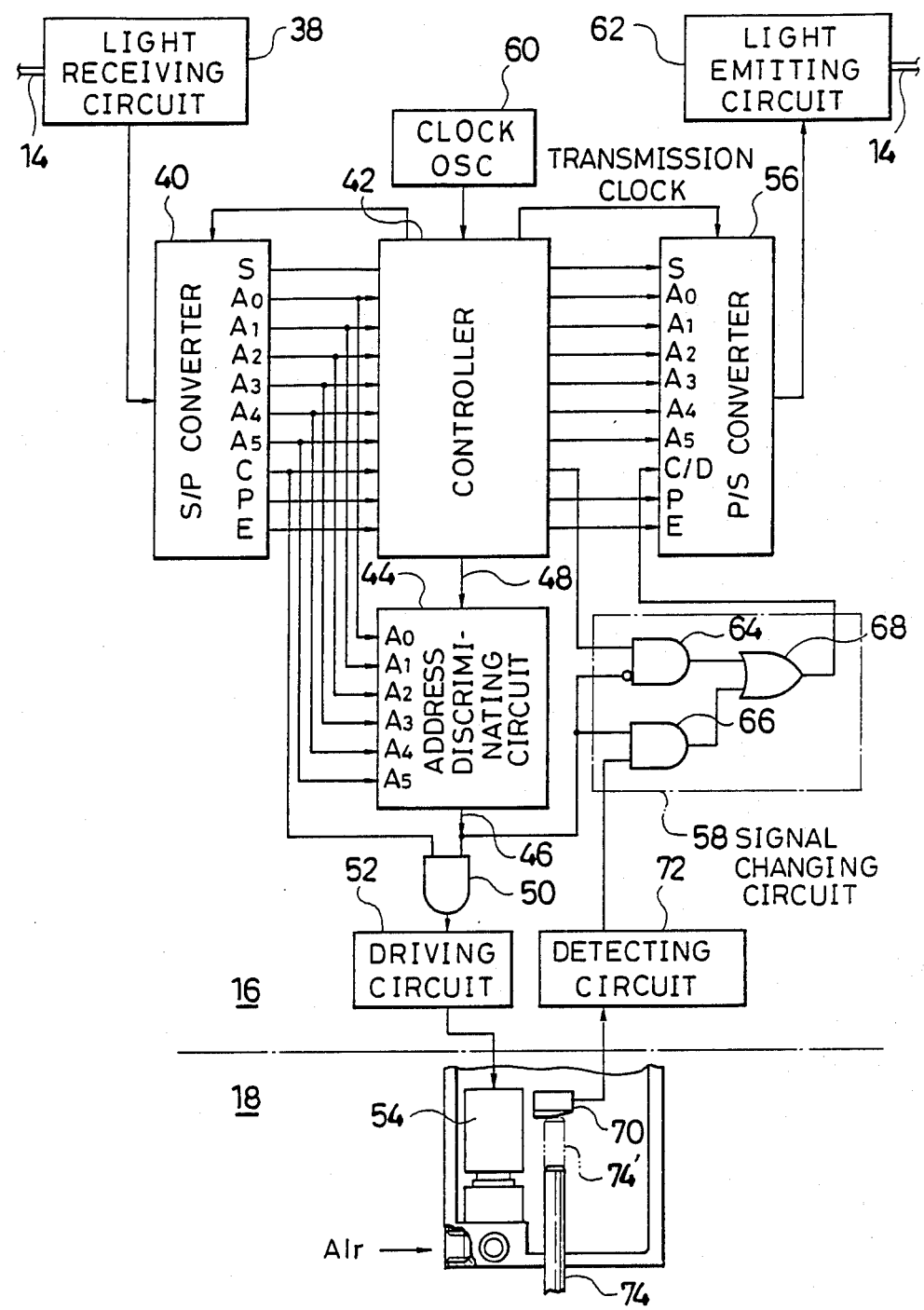
FIG. 4 is a circuit block diagram showing an embodiment of a terminal unit in FIG. 2.

FIG. 4 is a block diagram showing an embodiment of the terminal units 16 of Nos. 1 to n shown in FIG. 2. In FIG. 4, a light receiving circuit 38 converts the optical signal which is obtained from the central unit 10 or from the terminal unit 16 arranged at the front stage through the optical fiber line 14 into the reception optical data whose logic level is set to "1" or "0" in accordance with the presence or absence of the optical signal. The light receiving circuit 38 then serially outputs the communication data having the frame constitution of ten bits shown in FIG. 5. The reception optical data which is serially output from the light receiving circuit 38 is input to a series/parallel converter (S/P converter) 40 and converted into the ten-bit parallel data having the bit constitution shown in FIG. 5. This parallel data is output to a controller 42. The outputs of the address bits "$A_0$" to "$A_5$" from the S/P converter 40 are supplied to an address discriminating circuit 44. Self addresses which are different every terminal unit are preset in the address discriminating circuit 44. When the reception address from the S/P converter 38 coincides with the self preset address, an address discrimination output 46 is generated. On the other hand, the controller 42 detects the reception timing of the reception data of ten bits which are derived from the S/P converter 40 on the basis of the start bit "S" and end bit "E". The controller 42 also checks the parity of the reception data by use of the parity bit "P". When it is determined by the parity check that the data has normally received, the controller 42 outputs an operation enable signal 48 to the address discriminating circuit 44. When a parity error is detected, the operation enable signal 48 is not output to the address discriminating circuit 44.

A discrimination signal 46 (H level output) which is derived when the coincidence of the self address was decided by the address discriminating circuit 44 is input to one input terminal of an AND gate 50. The output of the control bit "C" from the S/P converter 38 is input to the other input terminal of the AND gate 50. Therefore, when the coincidence of the self address is decided by the address discriminating circuit 44, the AND gate 50 supplies the bit signal of the control bit "C" to a driving circuit 52. When the control bit is set to "1", the driving circuit 52 supplies a current to an electromagnetic solenoid of a solenoid valve 54 provided for the side of the valve unit 18, thereby opening the solenoid valve 54. On the other hand, when the control bit "C" is set to "0", the driving circuit 52 stops the supply of the current to the solenoid valve 54, thereby closing the solenoid valve 54.

The bit outputs of the reception data which are input in parallel from the S/P converter 40 to the controller 42 are latched when the end of reception is detected on the basis of the output of the end bit "E". The bit signals excluding the control bit "C" are directly input to a parallel/series converter (P/S converter) 56. The bit signal of the control bit "C" is input to the P/S converter 56 through a signal changing circuit 58. Simultaneously with the detection of the end of reception, the P/S converter 56 receives the transmission clock produced in the controller 42 on the basis of the clock pulse from a clock oscillator 60. The P/S converter 56 converts the 10-bit communication data derived through the controller 42 and signal changing circuit 58 into the serial data and supplies this serial data to a light emitting circuit 62. The light emitting circuit 62 drives the light emitting element to emit the light when the bit is set to "1". The light emitting circuit 62 stops the driving of the light emitting element when the bit is set to "0". The light emitting circuit 62 converts the reception optical data into the optical signal and transmits the optical signal to the optical fiber line 14 at the post stage.

The bit signal of the control bit "C" in the reception data latched by the controller 42 is input to the signal changing circuit 58. The signal changing circuit 58 has AND gates 64 and 66 and an OR gate 68. The bit signal of the control bit "C" from the controller 42 is input to one input terminal of the AND gate 64. The discrimination signal 46 from the address discriminating circuit 44 is input to the other inverting input terminal. Therefore, when the coincidence of the self address is decided by the address discriminating circuit 44, the discrimination signal 46 is set to the H (high) level. In this state, the AND gate 64 is set to the inhibition state by the inverted input of the H level discrimination signal 46. On the contrary, when the coincidence of the self address is not decided, the discrimination signal 46 is set to the L (low) level. The AND gate 64 is set to the permission state by the inverted input of the L level discrimination signal 46. In this case, the bit signal of the control bit "C" is supplied to the P/S converter 56 through the OR gate 68.

The discrimination signal 46 of the address discriminating circuit 44 is supplied to one input terminal of the AND gate 66. An output of a detecting circuit 72 which outputs a detection signal corresponding to the ON/OFF state of a limit switch 70 provided for the valve unit 18 is supplied to the other input terminal of the AND gate 66. The discrimination signal 46 which is set to the H level when the coincidence of the self address was determined by the address discriminating circuit 44 is input to the AND gate 66, so that the AND gate 66 is set to the permission state. The detection signal of the detecting circuit 72 at this time is supplied to the P/S converter 56 through the OR gate 68.

Practically speaking, it is now assumed that a pneumatic pressure operating valve (not shown) to ON/OFF control the pneumatic pressure by the solenoid valve 54 and to perform the opening/closing control of the fluid on the basis of the pneumatic pressure is provided as the valve unit 18. The limit switch 70 is attached so as to face a valve rod 74 of the pneumatic pressure operating valve. The limit switch 70 is turned off in the closed state of the pneumatic pressure operating valve in which the valve rod 74 is dropped as shown in FIG. 4. When the limit switch 74 is turned off, the detecting circuit 72 generates a detection output which is set to the L level indicative of the closed state of the valve. On the contrary, when the operating valve is opened and the valve rod 74 is lifted up to a position indicated at 74', the limit switch 70 is turned on. At this time, the detecting circuit 72 generates the H level output indicating that the operating valve is open.

Therefore, when the coincidence of the self address is determined by the address discriminating circuit 44 and the AND gate 66 is set to the permission state, the detection output of the detecting circuit 72 supplies the signal to give the data bit "D" to a C/D terminal of the P/S converter 56 through the OR gate 68. Thus, in the terminal unit 16, the control bit "C" serving as the control instruction bit in the reception data is rewritten into the data bit "D" indicative of the operating state of the valve unit 18.

The operation of the foregoing embodiment will now be described with reference to a timing chart of FIG. 7.

First, on the basis of the solenoid valve control signals $E_1$ to $E_n$ of the terminal units 16 of Nos. 1 to n which are supplied from the external control unit 12, the central unit 10 converts each of the control signals $E_1$ to $E_n$ into the 10-bit communication data including the terminal address bits "$A_0$" to "$A_5$" and control bit "C" by the transmission controller 24 as shown in FIG. 3 and further converts into the serial data by the P/S converter 28 and supplies this serial data to the light emitting circuit 30. Subsequently, the optical signal consisting of the data indicative of the presence or absence of the lights corresponding to the bits of the communication data is sequentially transmitted through the optical fiber line 14 at the timings of times $t_1$, $t_2$, $t_3$, $t_4$, . . . .

The optical signal from the central unit 10 is first received by the terminal unit 16 of No. 1 from time $t_1$ as the first transmission timing. Each time the reception optical data is received by the light receiving circuit 38, the S/P converter 40 in the terminal unit 16 shown in FIG. 4 outputs the bit signal. The controller 42 starts the reception control in response to the bit output of the start bit "S" from the S/P converter 40. When the reception output of the parity bit "P" of the ninth bit is obtained, the parity check is executed. When the reception output of the end bit "E" as the final bit is derived, the end of reception is detected and the reception data is latched. The latched reception data is supplied to the P/S converter 56. The controller 42 starts the supply of the transmission clock to the P/S converter 56 synchronously with the detection of the end of reception and converts the parallel reception data into the serial bit data and output. Therefore, the light emitting circuit 62 converts the transmission data which is serially output from the P/S converter 56 from time $t_2$ into the optical signal and transmits this optical signal to the optical fiber line 14 at the post stage.

On the other hand, by the parity check based on the parity bit "P", when the controller 42 detects that the normal terminal data has been received, the operation enable signal 48 is output to the address discriminating circuit 44. The address discriminating circuit 44 compares the address bits "$A_0$" to "$A_5$" from the S/P converter 40 with the preset self address. Since the first terminal data is the control data for the terminal unit 16 of No. 1, the coincidence of the self address is determined and the discrimination signal 46 of the H level is output. The AND gate 50 is set to the permission state by the H level discrimination signal 46. The bit signal of the control bit "C" obtained from the S/P converter 40 is given to the driving circuit 52. On the basis of the bit signal of the control bit "C", the driving circuit 52 drives the solenoid valve 54 attached to the valve unit 18 of No. 1. Namely, when the control bit "C" is set to "1", the driving circuit 52 supplies a current to the solenoid valve 54 and opens the solenoid valve 54, thereby supplying the pneumatic pressure to the pneumatic pressure operating valve and opening the valve. On the other hand, when the control bit "C" is set to "0", the driving circuit 52 does not supply a current to the solenoid valve 54, so that the solenoid valve 54 is held in the closed state.

In addition, the H level discrimination signal 46 of the address discriminating circuit 44 is supplied to the AND gates 64 and 66 in the signal changing circuit 58. In this case, since the inverted input of the H level discrimination signal 46 is supplied to the AND gate 64, the bit signal of the control bit "C" which is supplied through the controller 42 is not transmitted to the OR gate 68. On the other hand, the AND gate 66 is supplied with the H level discrimination signal 46 and is set to the permission state. In this case, assuming that the pneumatic pressure operating valve was closed and the valve rod 74 was disposed in the dropped position as shown in FIG. 4, the limit switch 70 is turned off and the detecting circuit 72 generates the output of the logic level "0". This output of the detecting circuit 72 is supplied to the C/D terminal of the P/S converter 56 through the AND gate 66 and OR gate 68. The data bit "D" indicative of the operating state of the valve unit 18 of No. 1 by the detecting circuit 72 is supplied to the light emitting circuit 62 at the transmission timing of the data bit "D" based on the transmission clock from the controller 42. The data bit "D" is then transferred as the optical signal to the optical fiber line 14 at the post stage.

Such a transmitting operation in the terminal unit 16 of No. 1 to the terminal unit 16 of No. 2 at the next stage is executed at the timing of time $t_2$ to $t_3$. The data transmitted from the terminal unit 16 of No. 1 to the next terminal unit 16 of No. 2 at time $t_2$ is received by the terminal unit 16 of No. 2 from the timing of time $t_2$. The data is transmitted from the terminal unit 16 of No. 2 to the next terminal unit 16 of No. 3 for the next interval from time $t_3$ to time $t_4$.

The data which is transmitted from the terminal unit 16 of No. 2 for the interval from time $t_3$ to time $t_4$ is the reception data which was received from the terminal unit 16 of No. 1 at the timing from time $t_2$ to time $t_3$ and has the address to designate the terminal unit of No. 1. This address does not coincide with the self address of the terminal unit 16 of No. 2. Therefore, the discrimination signal 46 of the address discriminating circuit 44 shown in FIG. 4 which is provided for the terminal unit 16 of No. 2 is set to the L level at the timing from time t₃ to time t₄. Thus, the AND gate 66 is set to the inhibition state and the detection signal of the detecting circuit 72 is not supplied to the P/S converter 56. On the other hand, the AND gate 64 is set to the permission state because of the inverted input of the L level discrimination signal 46, so that the control bit "C" from the S/P converter 40 is directly transferred to the C/D terminal of the P/S converter 56. The reception data from the terminal unit 16 of No. 1 which was first received (the control bit "C" in this data has already been rewritten to the data bit "D") is not changed but is directly transferred to the next terminal unit 16 of No. 3. On the basis of the reception data which is received at the timing from t₃ to time t₄ and has the address to designate the terminal unit 16 of No. 2, the terminal unit 16 of No. 2 changes the control bit "C" in the reception data to the data bit "D" indicative of the operating state of the terminal apparatus for the interval from time t₄ to time t₅ on the basis of the coincidence of the self address. Then, the terminal unit 16 of No. 2 sends the data bit "D" to the next terminal unit 16 of No. 3.

When the coincidence of the self address is determined in the terminal unit with regard to the communication data of each terminal which was transmitted from the central unit 10, the control bit "C" in the reception data is rewritten to the data bit "D" indicative of the operating state of the terminal apparatus and thereafter, the reception data having the data bit "D" is sent to the next terminal unit. On the other hand, when the coincidence of the self address is not detected, the reception data is directly sent to the next terminal unit and sequentially passes through the terminal units 16 of Nos. 1 to n. The reception data is finally returned to the central unit 10 as the data whose control bit "C" was rewritten to the data bit "D" indicative of the state of the terminal apparatus.

Therefore, assuming that the number of terminal units is (n) and the transmission time of the data bit per terminal in the terminal data consisting of ten bits is (T), the central unit 10 receives the terminal data which was first transmitted after the elapse of time of (T × n) after the first terminal data had been transmitted.

The return data from the terminal units 16 which is sequentially received by the central unit 10 is converted into the reception optical data by the light receiving circuit 32 and thereafter, it is converted into the parallel data by the S/P converter 34 as shown in FIG. 3. Thereafter, the terminal unit is discriminated from the address bits "A₀" to "A₅" in the reception data by the decoder 36. The operating state of the valve unit is also discriminated from the data bit "D". The signals e1 to en indicative of the operating states are sequentially output every terminal.

After the central unit 10 has completely transmitted the data of all of the terminals, it again transmits the first terminal data. These transmitting operations are repeated.

A method of detecting a transmission error in the communication control system according to the invention will now be described.

First, in the terminal units 16 of Nos. 1 to n, as shown in FIG. 4, the controller 42 checks the parity of the reception data. When the parity error is detected, the coincidence of the address is not discriminated but the reception data having the parity error is directly transmitted.

Therefore, the communication data having the parity error is directly returned to the central unit 10. An error is detected by checking the parity error in the reception data. When this error continues for a time longer than a predetermined period of time which was decided on the basis of the response speed (50 to 100 msec) of the solenoid valve, the transmission error is alarmed and displayed or the fail-safe operation is performed.

On the other hand, for the breakdown of the address data, since the data is returned from the final terminal unit to the central unit 10 in accordance with the transmission order, the address in the reception data is interpreted in the central unit 10 and when the reception addresses cannot be obtained in accordance with the correct order based on the transmission order, it is determined that the data has an error. When the data error continues for a predetermined period of time, the transmission error may be also alarmed or the fail-safe operation may be executed.

The transmission controller 24 and decoder 36 in the central unit 10 shown in FIG. 3 can be realized by the program control of a microcomputer, respectively. The controller 42, address discriminating circuit 44, AND gate 50, and signal changing circuit 58 in the terminal unit shown in FIG. 4 can be also realized by the program control by a microcomputer.

As described above, according to the invention, a plurality of terminal units are connected to the central unit by the optical fiber line in a loop form, thereby constituting the optical fiber link. Therefore, it is sufficient to form the optical fiber line of one loop irrespective of the number of terminals. The optical fiber line can be easily installed and the system costs can be remarkably reduced.

On the other hand, when the coincidence of the self address is detected in the terminal unit, the fluid control valve is controlled on the basis of the control instruction bit in the reception data and at the same time, the control instruction bit is changed to the data bit indicative of the operating state of the terminal apparatus at that time and this data bit is transferred to the optical fiber line at the post stage. Therefore, by merely sending the communication data having the control instruction bit from the central unit to the terminal unit, the reception data having the data bit indicative of the operating state of the terminal apparatus can be obtained from the final terminal. Thus, both of the transmission of the control instruction between the central unit and the terminal units and the transmission of the data indicative of the operating state of the terminal apparatus can be realized by a single loop communication. The transmitting efficiency can be extremely improved as compared with that in the case of individually transmitting the control instruction and data indicative of the operating state of the terminal apparatus.

Further, after each terminal unit once interpreted the optical signal input and converted into the bit data of "1" or "0", the bit data is converted into the optical signal and sent to the next terminal unit. Therefore, for example, a data error occurs due to the accumulation of the signal waveform distortion because of the conversion distortion in the case of the optical fiber loop constituted by the converter which is constituted in such a manner that after the terminal unit merely converted the optical signal into the reception optical signal by the light receiving element, the light emitting element is directly driven by the reception optical signal and the reception optical signal is again converted into the optical signal and transmitted. However, according to the present invention, such a data error due to the accumulation of the conversion distortion in the terminal unit does not occur at all. Even if a number of terminal units are connected in a loop form, the optical data can be accurately transmitted without causing any data error.

Moreover, since one terminal unit always has the right to transmit the signal to the next terminal unit, it is possible to realize the excellent communication control which does not cause the collision of signals by the collision of transmission rights and the deadlock in which the terminal units enter the transmission standby mode; such collision and deadlock occur in what is called a fundamental procedure communication system or the like.

What is claimed is:

1. A communication control system of fluid control valves, comprising:
    a central unit;
    a plurality of terminal units which are provided integrally with or near fluid control valves; and
    an optical fiber line for connecting said central unit with said plurality of terminal units in a loop form, wherein said central unit has
    (a) data transmitting means for converting control data including control instructions and terminal addresses based on a plurality of valve control signals which are output in parallel from an external control unit into a serial optical signal and for transmitting said serial optical signal to said optical fiber line, and
    (b) data receiving means for receiving the optical signal from the final terminal unit disposed at the final position of said loop connection, for interpreting data included in said reception data and indicative of the operating state of a terminal apparatus, and for outputting this data to said external control unit,
    and each of said terminal units has
    (i) data transmitting/receiving means for receiving the optical signal which is derived through said optical fiber line, for converting this optical signal into the reception optical data, for converting said reception optical data into the serial optical signal synchronously with the detection of the end of reception of said reception data, and for outputting the serial optical signal to the optical fiber line at the post stage,
    (ii) address discriminating means for outputting a control signal corresponding to a control instruction bit in said reception optical data to the fluid control valve when the coincidence of the self address is detected from said reception optical data, and
    (iii) data changing means for changing the control instruction bit in said reception optical data into the detection data indicative of the operating state of the terminal apparatus due to the fluid control valve when the coincidence of the self address is detected by said address discriminating means, and for allowing said detection data to be transmitted from said data transmitting/receiving means.

2. A communication control system according to claim 1, wherein said data receiving means in said central unit includes:
    error detecting means for detecting a transmission error from a parity check data included in the reception data; and
    means for instructing an alarm indication or a fail-safe operation when the error detection by said error detecting means continues for a time longer than a period of time which is predetermined on the basis of a response speed of the fluid control valve.

3. A communication control system according to claim 1, wherein said data receiving means in said central unit includes:
    error discriminating means for interpreting the addresses in the reception data and for determining that an error is included in the data when the reception addresses are not obtained in accordance with the correct order based on the transmission order; and
    means for instructing an alarm indication or a fail-safe operation when an output of said error discriminating means continues for a time longer than a period of time which is predetermined on the basis of a response speed of said fluid control valve.

4. A communication control system according to claim 1, wherein said data transmitting/receiving means in said terminal unit includes means which, when a parity error is detected by the parity check of the reception data, does not make operative said address discriminating means and said data changing means but directly converts the reception data whose parity error was detected into the serial optical signal and outputs said serial optical signal.

* * * * *